United States Patent
Hofmann et al.

(10) Patent No.: US 9,382,944 B2
(45) Date of Patent: Jul. 5, 2016

(54) GREASE PASSAGE IN FLANGED BEARINGS

(75) Inventors: Matthias Hofmann, Schweinfurt (DE);
Werner Horn, Schweinfurt (DE);
Holger Kristandt, Euerbech (DE);
Baozhu Liang, Dittelbrunn-Hambach (DE); Edgar Pickel, Sommeraoh (DE);
Ingo Schulz, Gerolzhofen (DE);
Mathias Seuberling, Großeibstadt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 822 days.

(21) Appl. No.: 13/808,146

(22) PCT Filed: Jul. 5, 2011

(86) PCT No.: PCT/EP2011/061338
§ 371 (c)(1),
(2), (4) Date: Apr. 15, 2013

(87) PCT Pub. No.: WO2012/004272
PCT Pub. Date: Jan. 12, 2012

(65) Prior Publication Data
US 2013/0216385 A1 Aug. 22, 2013

(30) Foreign Application Priority Data
Jul. 6, 2010 (DE) .......... 10 2010 026 2706

(51) Int. Cl.
*F16C 33/66* (2006.01)
*F16C 43/04* (2006.01)
*F16C 33/00* (2006.01)
*F16C 33/58* (2006.01)
*F16C 35/04* (2006.01)
*F16C 35/067* (2006.01)

(52) U.S. Cl.
CPC .......... *F16C 33/00* (2013.01); *F16C 33/58* (2013.01); *F16C 33/6622* (2013.01); *F16C 35/045* (2013.01); *F16C 35/067* (2013.01); *F16C 2226/60* (2013.01); *F16C 2300/14* (2013.01); *F16C 2360/31* (2013.01)

(58) Field of Classification Search
CPC ............ F16C 33/6622; F16C 33/6629; F16C 33/6659; F16C 33/6677; F16C 33/6681; F16C 35/045; F16C 35/067; F16C 2226/60; F16C 2360/31
USPC .................. 384/473–475, 542, 585
See application file for complete search history.

(56) References Cited

U.S. PATENT DOCUMENTS

| 4,108,506 A * | 8/1978 | Osborn ............... F16C 19/183 384/471 |
| 2008/0050061 A1 | 2/2008 | Lefebvre et al. |
| 2010/0179011 A1 * | 7/2010 | Demtroder et al. . F03D 11/0008 475/159 |

FOREIGN PATENT DOCUMENTS

| DE | 4317618 A1 | 1/1994 |
| DE | 102007048377 A1 | 4/2009 |
| DE | 102008036223 A1 * | 2/2010 ............. F16C 19/49 |
| WO | WO03019004 A1 | 3/2003 |

* cited by examiner

*Primary Examiner* — Phillip A Johnson
(74) *Attorney, Agent, or Firm* — Bryan Peckjian; SKF USA Inc. Patent Dept.

(57) ABSTRACT

A bearing having grease lubrication includes a first ring and a second ring. A plurality of screw holes axially extend through the first ring. A first axial end of the first ring is affixed to a housing by a plurality of screws extending from the housing into the respective screw holes. A first bore is defined in the first ring adjacent to a second axial end of the first ring. The first bore intersects and fluidly communicates with one of the screw holes such that grease is dischargeable therethrough.

20 Claims, 2 Drawing Sheets

US 9,382,944 B2

GREASE PASSAGE IN FLANGED BEARINGS

CROSS-REFERENCE

This application is the U.S. National Stage of International Application No. PCT/EP2011/061338 filed on Jul. 5, 2011, which claims priority to German patent application no. 10 2010 026 270.6 filed on Jul. 6, 2010.

TECHNICAL FIELD

The present application relates to a bearing, which may be utilized, e.g., in a wind turbine.

PRIOR ART

In bearings having grease lubrication, which are flanged onto a housing via one of the rings, e.g. by a screw-fastening, the problem results of the grease supply and also of the grease discharge, since the available space is very limited due to the numerous screw holes. Expensive additional installations are required in this case.

Hitherto this problem has been solved with expensive additional installations.

SUMMARY OF THE INVENTION

The described problem is solved by supplying the grease to the housing side through a radial bore, which passes through between the screw bores, to the intermediate space of the outer ring and inner ring. The grease discharge occurs through a bore on the side facing away from the housing. This bore opens into a screw through-hole, which serves inter alia to screw-fasten the ring with the housing. A screw is inserted into the screw through-hole, which screw is so short that it does not close the grease discharge bore, so that the grease can exit through the bore, which is not closed by the screw. The through-hole can be provided with a continuous thread, in order to accommodate additional installations, e.g., for grease collection.

It is advantageous that no additional installations are necessary for the grease supply and grease discharge. Further, a grease channel is completely internal. In addition, existing resources are used (threaded bore); hence the solution is (almost) a "per se" solution, wherein only the radial bore for the grease supply must be specially introduced; therefore the solution is simple. In addition, it is advantageous that a definite grease passage direction results; therefore the solution is definite.

A diameter of the radial bore on the housing side preferably is between eight and ten millimeters. An effective grease-passage can be achieved in this case.

A diameter of the bore on the side facing away from the housing advantageously is fifteen millimeters or more. An effective grease discharge can be achieved thereby in a reliable manner.

BRIEF DESCRIPTION OF THE DRAWINGS

Hereinafter exemplary embodiments will be described and explained in more detail with reference to the accompanying drawings and figures.

DETAILED DESCRIPTION OF THE INVENTION

Figure 1:
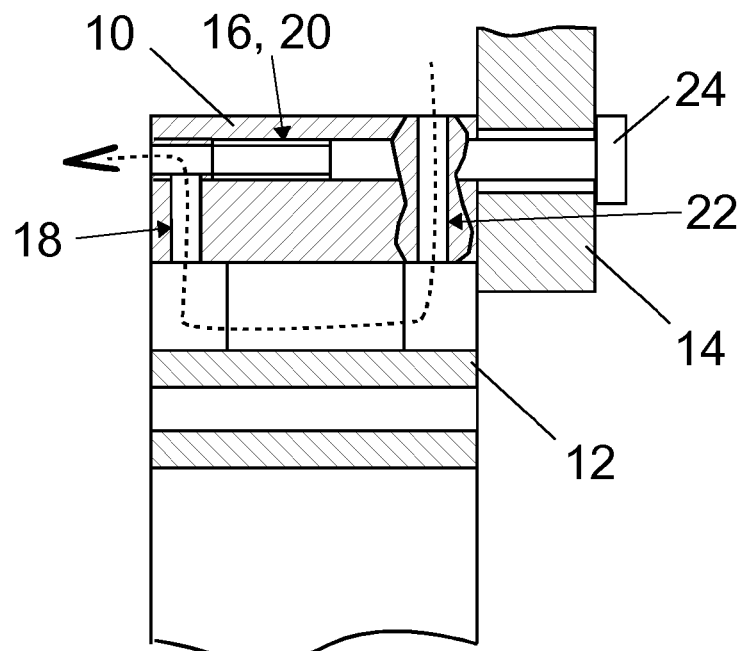
FIG. 1 shows a partial section through a part of a bearing according to the invention and through a part of a housing.

FIG. 1 shows a partial section through a part of a bearing having grease lubrication and through a part of a housing 14, wherein the bearing includes a first ring 10, which is formed as an outer ring. Further, the bearing includes a second ring 12 formed as inner ring 12. The bearing is flanged via the ring 10 onto the housing 14. Furthermore, the bearing includes screw holes 16. The screw holes are incorporated into the outer ring. One of the screw holes 16 is a screw through-hole 20, into which a bore 18 opens, which is disposed on the side of the ring 10 facing away from the housing and through which the grease discharge for the grease lubrication occurs. The bore 18 extends along a radial direction of the bearing. The screw through-hole has a continuous thread. In an alternative embodiment, only a part of the screw through-hole has a thread, so that the screw through-hole in that case differs from a screw through-hole having a continuous thread. In addition, a screw 24 is inserted in the screw through-hole 20, which screw 24 is so short that it leaves the bore unclosed on the side of the ring 10 facing away from the housing, so that the grease can exit through the bore 18 on the side facing away from the housing. The screw through-hole 20 serves, inter alia, to screw-fasten the ring 10 with the housing 14, wherein the screw-fastening occurs using the screws 24. The diameter of the bore 18 is thirty millimeters.

The bearing has a radial bore 22 on the housing side, which passes through between the screw holes 16 formed as screw bores. The radial bore is incorporated into the ring 10. The grease is supplied through the radial bore 22 to the intermediate space of the outer ring 10 and the inner ring 12. In the intermediate space, transport of the grease occurs in the axial direction of the bearing in a particularly simple manner. The radial bore 22 has an axial direction which differs from an axial direction of the bearing. The axial direction of the radial bore 22 is parallel to a first radial direction of the bearing. The bore 18 extends radially in the inner ring 12 and is angularly offset from the radial bore 22 in a circumferential direction of the inner ring 12. Further, the axial direction of the bore 18 is parallel to a second radial direction of the bearing, which differs from the first radial direction of the bearing. The diameter of the bore 22 is eight millimeters.

In operation, the grease moves through the bore 22, through the intermediate space between the outer ring 10 and the inner ring 12, and through the bore 18 into the screw through-hole 20, through which it exits the bearing. A grease collection means can be disposed (not shown) at one end of the screw through-hole 20. Further, a grease nipple can be disposed (not shown) at one end of the bore 22, which faces away from the intermediate space.

Figure 2:
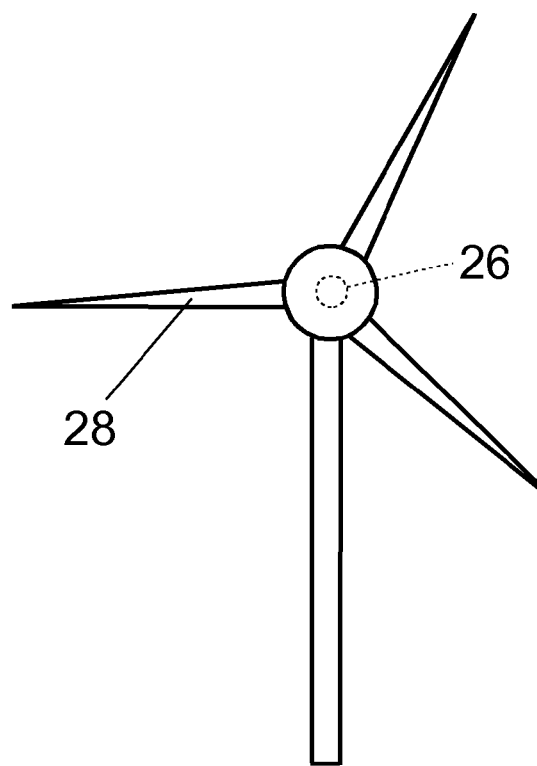
FIG. 2 shows a wind turbine having the bearing.

FIG. 2 shows a wind turbine, which includes the bearing according to the present teachings. The bearing forms the main bearing 26 of the wind turbine and directly supports the rotor blades 28 of the wind turbine. The bearing can, however, also be used for machines other than wind turbines.

Figure 3:
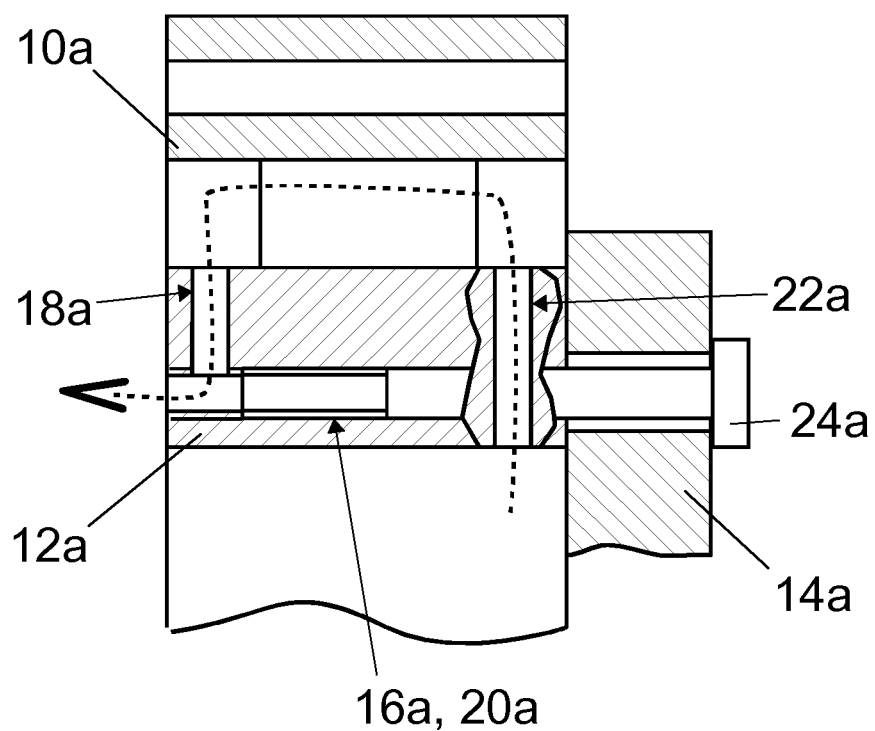
FIG. 3 shows a partial section through a part of an alternative embodiment of a bearing according to the invention and through a housing.

In FIG. 3 an alternative exemplary embodiment is shown. Essentially unchanged components, characteristics, and functions are in principle numbered with the same reference numbers. However, to differentiate the exemplary embodiments, the letter "a" is added to the reference numbers of the exemplary embodiment in FIG. 3. The following description is essentially limited to the differences to the exemplary embodiment in FIG. 1 and FIG. 2, wherein reference can be made to the description of the exemplary embodiment in FIG. 1 and FIG. 2 with respect to unchanged components, characteristics, and functions.

FIG. 3 shows a partial section through a part of an alternative embodiment of a bearing according to the invention and through a housing 14a. An inner ring 12a of the bearing is screw-fastened with the housing 14a by a screw 24a. The inner ring 12a includes screw holes 16a. One of the screw holes 16a is a screw through-hole 20a, into which a bore 18a, which is incorporated in the inner ring 12a, opens. A further bore 22a of the inner ring is disposed on a side of the inner ring 12a facing the housing.

REFERENCE NUMBER LIST

10 Ring
12 Ring
14 Housing
16 Screw hole
18 Bore
20 Screw through-hole
22 Bore
24 Screw
26 Main bearing
28 Rotor

The invention claimed is:

1. A bearing having grease lubrication, comprising:
a first ring and a second ring,
wherein a plurality of screw holes axially extend through the first ring,
a first axial end of the first ring is affixed to a housing by a plurality of screws extending from the housing into the respective screw holes, and
a first bore is defined in the first ring adjacent to a second axial end of the first ring, the first bore intersecting and fluidly communicating with one of the screw holes such that grease is dischargeable therethrough.

2. The bearing according to claim 1, wherein:
a second bore is defined in the first ring adjacent to the first axial end of the first ring,
the second bore radially passes between two of the screw holes that are adjacent to each other, and
the second bore is configured to supply grease into an intermediate space between the first and second rings.

3. The bearing according to claim 2, wherein the first bore extends radially in the first ring and is angularly offset from the second bore in a circumferential direction of the first ring.

4. The bearing according to claim 3, wherein the second bore has a diameter between eight and ten millimeters.

5. The bearing according to claim 4, wherein one of the plurality of screws, which extends in the screw hole that intersects and fluidly communicates with the first bore, does not cover the first bore, so that the grease is dischargeable from the intermediate space between the first and second rings via the first bore and the screw hole that intersects and fluidly communicates with the first bore.

6. The bearing according to claim 5, wherein the screw hole that intersects and fluidly communicates with the first bore has a continuous thread along its entire length.

7. The bearing according to claim 6, wherein the first bore has a diameter equal to or greater than fifteen millimeters.

8. The bearing according to claim 7, wherein the bearing is integrated into a wind turbine, the wind turbine having at least one rotor blade supported by the bearing.

9. The bearing according to claim 2, wherein the second bore has a diameter between eight and ten millimeters.

10. The bearing according to claim 1, wherein one of the plurality of screws, which extends in the screw hole that intersects and fluidly communicates with the first bore, does not cover the first bore, so that the grease is dischargeable from an intermediate space between the first and second rings via the first bore and the screw hole that intersects and fluidly communicates with the first bore.

11. The bearing according to claim 1, wherein the first bore has a diameter equal to or greater than fifteen millimeters.

12. The bearing according to claim 1, wherein the first ring is an outer ring of the bearing.

13. The bearing according to claim 12, wherein the bearing is integrated into a wind turbine, the wind turbine having at least one rotor blade supported by the bearing.

14. The bearing according to claim 1, wherein the first ring is an inner ring of the bearing.

15. A bearing comprising:
a first ring and a second ring defining an intermediate space therebetween,
wherein a plurality of screw holes axially extend through the first ring,
a first axial end of the first ring is affixable to a separate component by a plurality of screws extending from the separate component into the respective screw holes,
a first bore is defined in the first ring axially spaced from the first axial end, the first bore extending in a radial direction of the first ring so as to fluidly connect the intermediate space with one of the screw holes,
a second bore is defined in the first ring adjacent to the first axial end of the first ring, the second bore extending in the radial direction of the first ring between two of the screw holes that are adjacent to each other and fluidly connecting with the intermediate space, and
a grease channel is defined in the bearing such that grease is fluidly communicable from the second bore to the screw hole that intersects the first bore, where the grease is dischargable from the bearing, via the intermediate space and the first bore.

16. The bearing according to claim 15, wherein the first bore is disposed adjacent to a second axial end of the first ring.

17. The bearing according to claim 16, wherein the first bore is angularly offset from the second bore in a circumferential direction of the first ring.

18. The bearing according to claim 17, wherein the first bore has a diameter equal to or greater than fifteen millimeters and the second bore has a diameter between eight and ten millimeters.

19. The bearing according to claim 18, wherein the bearing is integrated into a wind turbine, the wind turbine having
at least one rotor blade supported by the bearing.

20. The wind turbine according to claim 19, wherein:
the separate component is a housing,
the plurality of screws extend from the housing into the respective screw holes such that the first ring is affixed to the housing, and
one of the plurality of screws, which extends in the screw hole that is fluidly connected with the intermediate space via the first bore, does not cover the first bore, so that the grease is dischargeable from the intermediate space via the first bore.

* * * * *